US012611964B2

(12) United States Patent　　(10) Patent No.:　US 12,611,964 B2
Kang　　(45) Date of Patent:　Apr. 28, 2026

(54) METHOD OF PROVIDING BATTERY REPLACEMENT SERVICE AND APPARATUS FOR PERFORMING THE METHOD

(71) Applicant: aiZEN Global Co., Inc., Seoul (KR)

(72) Inventor: Jung Seok Kang, Seoul (KR)

(73) Assignee: AIZEN GLOBAL CO., INC., Seoul (KR)

( * ) Notice: Subject to any disclaimer, the term of this patent is extended or adjusted under 35 U.S.C. 154(b) by 183 days.

(21) Appl. No.: 17/822,316

(22) Filed: Aug. 25, 2022

(65) Prior Publication Data

US 2023/0136848 A1　May 4, 2023

(30) Foreign Application Priority Data

Nov. 1, 2021　(KR) ........................ 10-2021-0148064

(51) Int. Cl.
　　*B60L 58/16*　　(2019.01)
　　*B60L 53/80*　　(2019.01)
(52) U.S. Cl.
　　CPC .............. *B60L 58/16* (2019.02); *B60L 53/80* (2019.02)
(58) Field of Classification Search
　　CPC ...... B60L 58/16; B60L 53/80; B60L 2240/80; B60L 53/66; B60L 58/12; B60L 53/53; B60L 53/665; B60L 2250/18; Y02T 10/70; Y02T 10/7072; Y02T 90/167; Y02T 10/64; H02J 7/00032; H02J 7/0048; B60Y 2200/91; G06Q 50/40
　　See application file for complete search history.

(56) References Cited

U.S. PATENT DOCUMENTS

| 10,807,493 | B1 * | 10/2020 | Reeves | ..................... B60L 3/12 |
| 2003/0209375 | A1 * | 11/2003 | Suzuki | ................... B60L 58/25 |
| | | | | 180/68.5 |

(Continued)

FOREIGN PATENT DOCUMENTS

| CN | 108364082 | A | 8/2018 | |
| CN | 115723617 | A　* | 3/2023 | .............. B60L 53/80 |

(Continued)

OTHER PUBLICATIONS

Office Action of Korean Application No. 10-2022-0095970 dated Nov. 25, 2024.

(Continued)

*Primary Examiner* — Sihar A Karwan
(74) *Attorney, Agent, or Firm* — Mark T. Vogelbacker; Eckert Seamans Cherin & Mellott, LLC

(57) ABSTRACT

A method of providing a battery replacement service and an apparatus for performing the method can include collecting, by a battery data collection unit, data about a battery, collecting, by an electric vehicle data collection unit, data about an electric vehicle, determining, by a battery replacement target determination unit, a target battery to be replaced among batteries, determining, by a battery replacement timing determination unit, a replacement timing of the target battery, determining, by a battery replacement place determination unit, a replacement place of the target battery and providing, by a battery replacement service providing unit, a replacement service for the target battery.

7 Claims, 9 Drawing Sheets

(56)     References Cited

U.S. PATENT DOCUMENTS

| | | | |
|---|---|---|---|
| 2015/0149015 A1* | 5/2015 | Nakano | B60L 58/12 |
| | | | 701/22 |
| 2016/0105054 A1* | 4/2016 | Horito | H02J 7/0031 |
| | | | 320/134 |
| 2019/0265716 A1* | 8/2019 | Nasu | B60L 53/36 |
| 2020/0326381 A1* | 10/2020 | Matsumura | G06Q 30/06 |
| 2020/0326382 A1* | 10/2020 | Matsumura | G01R 31/371 |
| 2020/0386561 A1* | 12/2020 | Namiki | B60L 53/80 |
| 2021/0091439 A1* | 3/2021 | Reeves | G06Q 30/0283 |
| 2022/0036330 A1* | 2/2022 | Ong | G06Q 30/0645 |
| 2022/0281345 A1* | 9/2022 | Kim | G06Q 50/40 |
| 2023/0061401 A1* | 3/2023 | Li | H02J 3/322 |
| 2023/0182575 A1* | 6/2023 | Kim | B60L 3/0046 |
| | | | 701/22 |
| 2024/0100987 A1* | 3/2024 | Lu | B60L 53/80 |
| 2024/0169444 A1* | 5/2024 | Endo | G06Q 30/0645 |

FOREIGN PATENT DOCUMENTS

| | | |
|---|---|---|
| KR | 20150049557 A | 5/2015 |
| KR | 20160092733 A | 8/2016 |
| KR | 20190139026 A | 12/2019 |
| KR | 20200002302 A | 1/2020 |

OTHER PUBLICATIONS

Office Action of SG Application No. 10202251520P, dated Jul. 28, 2025.

* cited by examiner

METHOD OF PROVIDING BATTERY REPLACEMENT SERVICE AND APPARATUS FOR PERFORMING THE METHOD

CROSS-REFERENCE TO RELATED APPLICATION

This application claims priority to and the benefit of Korean Patent Application No. 10-2021-0148064, filed on Nov. 1, 2021, the disclosure of which is incorporated herein by reference in its entirety.

BACKGROUND

1. Field of the Invention

The present invention relates to a method of providing a battery replacement service and an apparatus for performing the method. More specifically, the present invention relates to a method of providing a battery replacement service to provide a replacement service for a battery used in an electrically driven means of transportation (e.g., electric vehicle), and an apparatus for performing the method.

2. Discussion of Related Art

Globally, electric vehicles are attracting attention as a national environmental regulation project to reduce greenhouse gas emission. Since an electric vehicle is connected to a system for charging, as the number of electric vehicles increases, the load applied to the system due to charging also increases. When several electric vehicles are simultaneously being charged, the simultaneous charging may lead to an increase in peak power. Such a surge in demand for charging may lead to voltage variations in the system, increased losses, and, in severe cases, power outages.

Further, it takes a certain amount of time to charge the electric vehicle, and it is easy for charging stations with limited space to become saturated during times of high demand according to charging patterns of users.

In addition, since it takes a considerable amount of time to charge the electric vehicle even in the case of fast charging, it may take a lot of time for charging when there are many vehicles to be charged.

Therefore, in order for electric vehicles to be widely used, the problem of battery charging should be solved.

SUMMARY OF THE INVENTION

The present invention is directed to solving all of the above-described problems.

The present invention is also directed to providing a battery replacement service that allows a battery to be replaced to a ready-to-run state without wasting charging time by providing a battery replacement service without charging the battery.

The present invention is also directed to providing a battery of equal value when a user does not use a battery replacement service by enabling the user to replace the battery more rapidly and effectively based on driving data of the user and determining the value of the battery.

A representative configuration of the present invention for achieving the above objects is as follows.

According to an aspect of the present invention, there is provided a method of providing a battery replacement service comprises collecting, by a battery data collection unit, data about a battery, collecting, by an electric vehicle data collection unit, data about an electric vehicle, determining, by a battery replacement target determination unit, a target battery to be replaced among batteries, determining, by a battery replacement timing determination unit, a replacement timing of the target battery, determining, by a battery replacement place determination unit, a replacement place of the target battery and providing, by a battery replacement service providing unit, a replacement service for the target battery.

Meanwhile, the determining of the target battery includes determining, by the battery replacement target determination unit, the target battery based on route data and battery charge amount data, determining, by the battery replacement target determination unit, the target battery based on predicted route data, the battery charge amount data, and a first battery threshold value and determining, by the battery replacement target determination unit, the target battery based on user charging data and a second battery threshold value, wherein the first battery threshold value is determined in consideration of a battery environment, a driving environment, and a vehicle driving habit, and the second battery threshold value is determined in consideration of a charge amount at a time when the battery of the electric vehicle has been replaced in the past.

Further, the battery replacement service providing unit provides a first-type battery replacement service and a second-type battery replacement service. The first-type battery replacement service is a replacement service for a first-type battery in which a user's initial battery value is not considered and the second-type battery replacement service is a replacement service for a second-type battery in which a change in the user's initial battery value is considered.

According to another aspect of the present invention, there is provided a battery replacement system comprises a battery data collection unit configured to collect data about a battery, an electric vehicle data collection unit configured to collect data about an electric vehicle, a battery replacement target determination unit configured to determine a target battery to be replaced among batteries, a battery replacement timing determination unit configured to determine a replacement timing of the target battery, a battery replacement place determination unit configured to determine a replacement place of the target battery and a battery replacement service providing unit configured to provide a replacement service for the target battery.

Meanwhile, the battery replacement target determination unit is configured to determine the target battery based on route data and battery charge amount data, determine the target battery based on predicted route data, the battery charge amount data, and a first battery threshold value, and determine the target battery based on user charging data and a second battery threshold value, the first battery threshold value is determined in consideration of a battery environment, a driving environment, and a vehicle driving habit and the second battery threshold value is determined in consideration of a charge amount at a time when the battery of the electric vehicle has been replaced in the past.

Further, the battery replacement service providing unit provides a first-type battery replacement service and a second-type battery replacement service, the first-type battery replacement service is a replacement service for a first-type battery in which a user's initial battery value is not considered and the second-type battery replacement service is a replacement service for a second-type battery in which a change in the user's initial battery value is considered.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
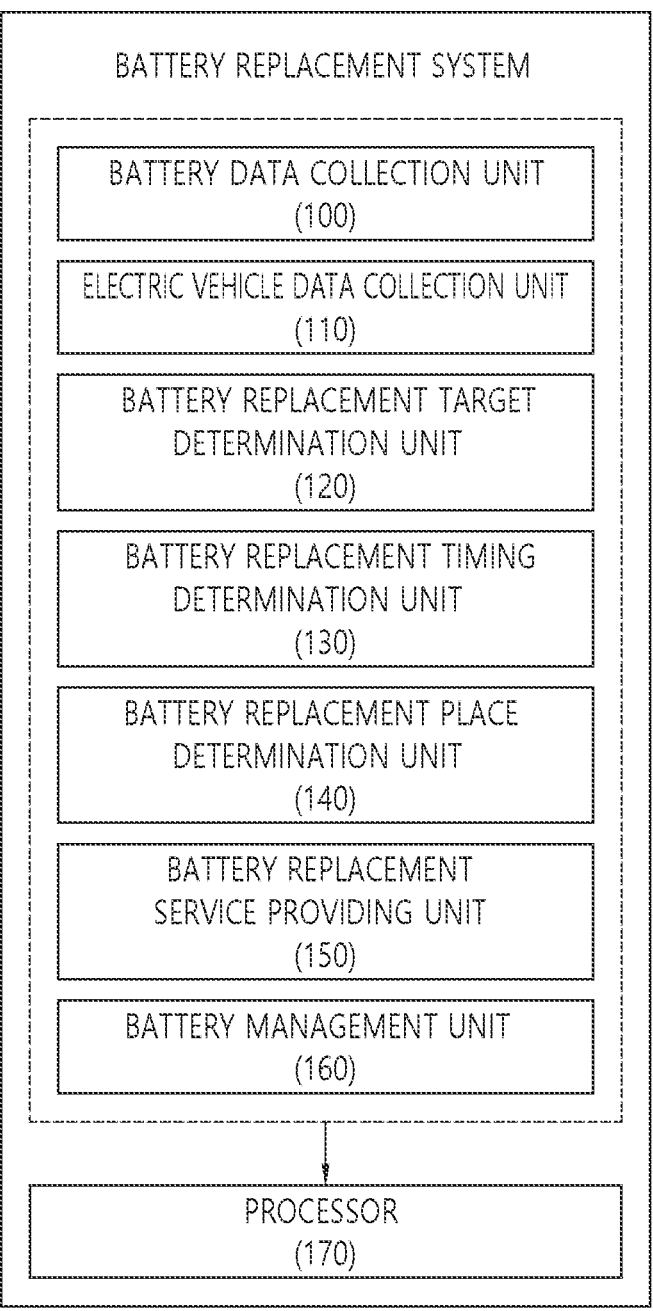
FIG. 1 is a conceptual diagram illustrating a battery replacement system according to an embodiment of the present invention.

The detailed description of the present invention will be made with reference to the accompanying drawings showing examples of specific embodiments of the present invention. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or arrangement of each component in each disclosed embodiment may be changed without departing from the scope and spirit of the present invention. Accordingly, there is no intent to limit the present invention to the detailed description to be described below. The scope of the present invention is defined by the appended claims and encompasses all equivalents that fall within the scope of the appended claims. Like reference numerals refer to the same or like elements throughout the description of the figures.

Hereinafter, in order to enable those skilled in the art to practice the present invention, exemplary embodiments of the present invention will be described in detail with reference to the accompanying drawings.

Hereinafter, the term "electric vehicle" used in the present invention may be used in a sense that includes a means of transportation (e.g., car, motorcycle, truck, etc.).

FIG. 1 is a conceptual diagram illustrating a battery replacement system according to an embodiment of the present invention.

In FIG. 1, a battery replacement system for providing a battery replacement service is disclosed.

Referring to FIG. 1, the battery replacement service is a service that provides a replacement service for a battery of an electric vehicle. That is, the battery replacement service may provide a fully charged battery without the time it takes to charge the battery by immediately changing the battery to a charged battery in order to reduce the waiting time for the battery charging.

The battery replacement system may include a battery data collection unit 100, an electric vehicle data collection unit 110, a battery replacement target determination unit 120, a battery replacement timing determination unit 130, a battery replacement place determination unit 140, a battery replacement service providing unit 150, a battery management unit 160, and a processor 170.

The battery data collection unit 100 may be implemented to collect data about a battery of an electric vehicle. The battery data of the electric vehicle may be periodically transmitted, and the battery data collection unit 100 may collect the periodically transmitted battery data of the electric vehicle. The battery data may include battery identifier data and battery state data. The battery identifier data may be identification data assigned to the battery for managing the battery, and the battery state data may include data about a current state of charge of the battery.

The electric vehicle data collection unit 110 may be implemented to collect data (e.g., driving data) about the electric vehicle. The electric vehicle data may include driving data related to the driving of the electric vehicle, and the driving data may include various pieces of data such as a destination to which the electric vehicle intends to move, route information, an electric vehicle speed, a vehicle driving environment, and the like.

The battery replacement target determination unit 120 may be implemented to determine a target battery, which is a battery to be replaced, among batteries. The battery to be replaced among the batteries may be determined based on the battery data and the electric vehicle data.

The battery replacement place determination unit 140 may be implemented to recommend a place for changing the target battery to a driver. The battery replacement place determination unit 140 may recommend the place for changing the target battery based on the battery data and the electric vehicle data.

The battery replacement timing determination unit 130 may be implemented to recommend a replacement timing of the target battery to the driver. The battery replacement timing determination unit 130 may recommend the replacement timing of the target battery based on the battery data and the electric vehicle data.

The battery replacement service providing unit 150 may be implemented to provide a battery replacement service. The electric vehicle may visit a battery replacement center for a battery replacement, and the battery replacement service providing unit 150 may be implemented to provide the battery replacement service to the electric vehicle that visits the battery replacement center.

The battery management unit 160 may be implemented to manage the battery. The battery management unit 160 may manage a battery state (or battery value) by managing information on a battery usage environment, driving data when using the battery, battery charging data, etc. for each of a plurality of batteries.

The processor 170 may be implemented to control the operations of the battery data collection unit 100, the electric vehicle data collection unit 110, the battery replacement target determination unit 120, the battery replacement timing determination unit 130, the battery replacement place determination unit 140, the battery replacement service providing unit 150, and the battery management unit 160.

Figure 2:
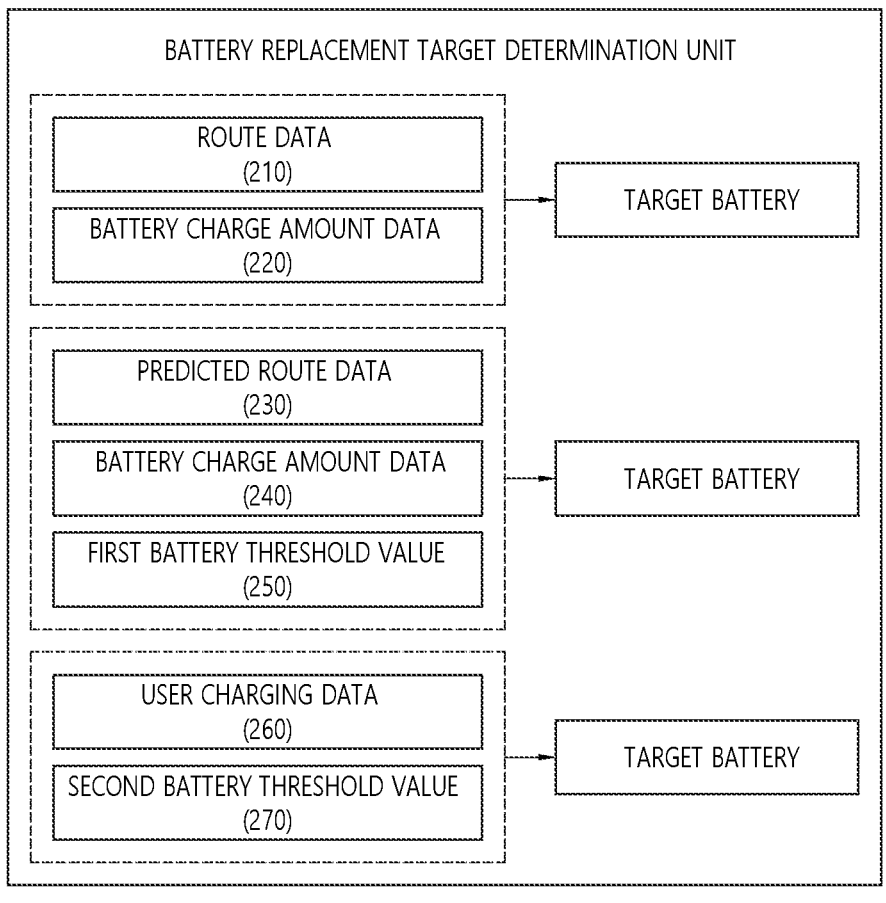
FIG. 2 is a conceptual diagram illustrating the operation of a battery replacement target determination unit according to an embodiment of the present invention.

FIG. 2 is a conceptual diagram illustrating the operation of a battery replacement target determination unit according to an embodiment of the present invention.

In FIG. 2, a method of determining, by the battery replacement target determination unit, a target battery to be replaced is disclosed.

Referring to FIG. 2, the battery replacement target determination unit may determine a target battery, which is a battery to be replaced, among batteries based on battery data and electric vehicle data.

The battery replacement target determination unit may determine whether the electric vehicle can arrive at a destination on a route with a charge amount of the battery on the basis of route data 210 of the electric vehicle included in the electric vehicle data and battery charge amount data 220 included in the battery data. When the electric vehicle cannot arrive at the destination with the current charge amount of the battery, the battery may be set as the target battery.

Further, the battery replacement target determination unit may determine the target battery based on predicted route data 230 and battery charge amount data 240. The predicted route data 230 may be used to determine the target battery in consideration of the predicted route data 230 of the electric vehicle in addition to the destination. Even when the predicted route data 230 is not directly input, the predicted route data 230 may be generated in consideration of data about a route along which the electric vehicle has moved in the past. In the case of an electric vehicle that repeatedly moves on the same or similar route, the predicted route data 230 and a predicted battery usage amount according to the predicted route data 230 may be determined. The battery replacement target determination unit may set the battery as the target battery in consideration of the predicted battery usage amount and the battery charge amount data 240 when the charge amount of the battery falls below a first battery threshold value 250. The first battery threshold value 250 may be adaptively determined in consideration of a battery environment, a driving environment, and a vehicle driving habit.

Further, when the route is not predicted, the battery replacement target determination unit may determine the target battery by setting a second battery threshold value 270. The second battery threshold value 270 may be determined in consideration of a charge amount at a time the battery of the electric vehicle has been replaced in the past. That is, the target battery may be determined based on the second battery threshold value 270 adaptively set for a driver in consideration of user charging data 260. The second battery threshold value 270 may be determined in consideration of the battery environment, the driving environment, and the vehicle driving habit.

Figure 3:
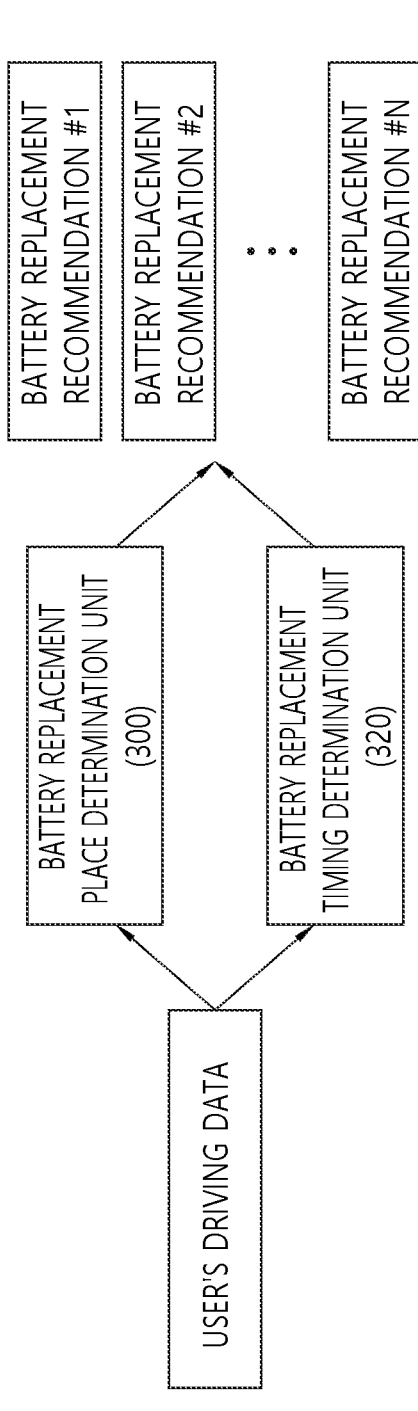
FIG. 3 is a conceptual diagram illustrating the operations of a battery replacement place determination unit and a battery replacement timing determination unit according to an embodiment of the present invention.

FIG. 3 is a conceptual diagram illustrating the operations of a battery replacement place determination unit and a battery replacement timing determination unit according to an embodiment of the present invention.

In FIG. 3, a method of providing information on a battery replacement place and information on a battery replacement timing after determination of a target battery is performed is disclosed.

Referring to FIG. 3, after the determination of the target battery is performed, a battery replacement place determination unit 300 may determine a battery replacement place for changing the target battery, and a battery replacement timing determination unit 320 may determine a replacement timing of the target battery.

The battery replacement place and the battery replacement timing may be recommended as a set, and a plurality of sets may be recommended.

For example, battery replacement recommendation #1 (including battery replacement place #1 and battery replacement timing #1), battery replacement recommendation #2 (including battery replacement place #2 and battery replacement timing #2), battery replacement recommendation #3 (including battery replacement place #3 and battery replacement timing #3), and the like may be recommended, and the user may select one from among the battery replacement recommendations to perform a battery replacement.

When the user selects a battery replacement recommendation in advance and then visits a battery replacement center, scheduling for a battery replacement is possible, and thus a discount on the battery replacement may be provided.

A region located on the route along which the user has driven in the past may be set as the battery replacement place based on the existing driving data of the user.

The battery replacement timing may be set in consideration of the existing travel time on the route along which the user has driven in the past, and the fastest timing for changing the battery may be set as the battery replacement timing based on the existing battery replacement scheduling data and the existing vehicle battery replacement visit data.

That is, the battery replacement place determination unit 300 and the battery replacement timing determination unit 320 may recommend the battery replacement place and the battery replacement timing so that the user can replace the battery of the electric vehicle at routine travel times on the route the user routinely travels.

Figure 4:
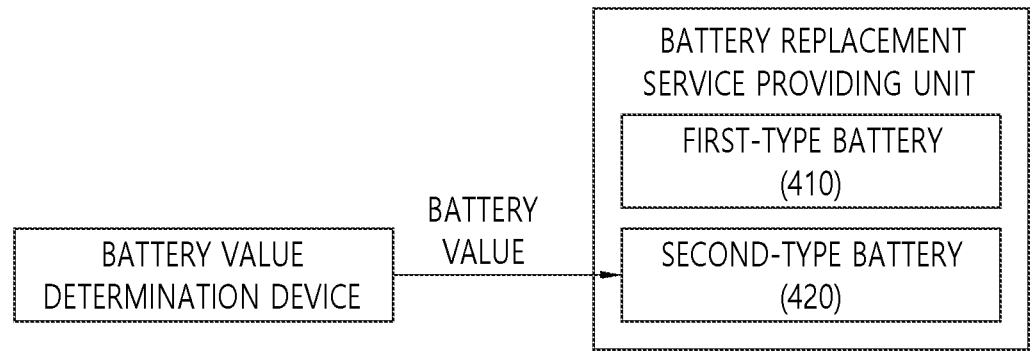
FIG. 4 is a conceptual diagram illustrating the operation of a battery replacement service providing unit according to an embodiment of the present invention.

FIG. 4 is a conceptual diagram illustrating the operation of a battery replacement service providing unit according to an embodiment of the present invention.

In FIG. 4, a battery replacement service provided by the battery replacement service providing unit is disclosed.

Referring to FIG. 4, when the battery replacement service providing unit provides the battery replacement service, the battery replacement service providing unit may provide the replacement service based on a current charging state of the battery.

For example, an amount of power that is required for charging at the battery replacement center when about $\frac{1}{5}$ of the current charge amount of the battery remains may be different from an amount of power that is required for charging at the battery replacement center when about $\frac{1}{3}$ of the current charge amount of the battery remains.

Therefore, the battery replacement service providing unit may charge a fee for the battery replacement service in consideration of a current battery charge amount of a target battery to be replaced. When about $\frac{1}{5}$ of the battery charge amount of the target battery to be replaced remains, a relatively higher fee for the battery replacement service may be charged than when about $\frac{1}{3}$ of the battery charge amount of the target battery to be replaced remains.

Further, the battery replacement service center may provide a replacement service by identifying the battery as one of two types (first-type battery 410 and second-type battery 420) of batteries when changing the battery. The battery replacement service may include a first-type battery replacement service for changing the first-type battery 410 and a second-type battery replacement service for changing the second-type battery 420.

The first-type battery 410 is a battery that is replaced without considering the user's vehicle battery value, and the second-type battery 420 is a battery that is replaced in consideration of the user's vehicle battery value. The user may request replacement of the battery in consideration of the first-type battery 410 or the second-type battery 420. The user cannot find the actual initial battery because the user also uses his/her own initial battery for replacement. However, when the user desires, the replacement service may not be provided, and a battery of the same value as when the initial battery was continuously used may be provided again in consideration of the user's driving data, battery usage information, or the like.

Therefore, when the user continues to use the first-type battery 410 and then needs to sell the vehicle or does not use the battery replacement service for a certain period of time, the user may request the second-type battery 420, and install the second-type battery 420 in the electric vehicle to sell the electric vehicle or directly charge and use the second-type battery 420 himself/herself.

When the user requests the second-type battery 420, the battery replacement service providing unit may determine a change in initial value of the battery of the user in consideration of the user's driving data, the battery data, or the like, and may provide the second-type battery 420 in which the change in value of the battery is considered to the user. Therefore, the battery replacement service providing unit may determine the value of the battery.

The battery replacement service providing unit may interwork with a battery value determination device to manage a battery value of each of a plurality of batteries to provide the second-type battery 420 to the user.

Hereinafter, in an embodiment of the present invention, a method of determining a battery value is disclosed.

Figure 5:
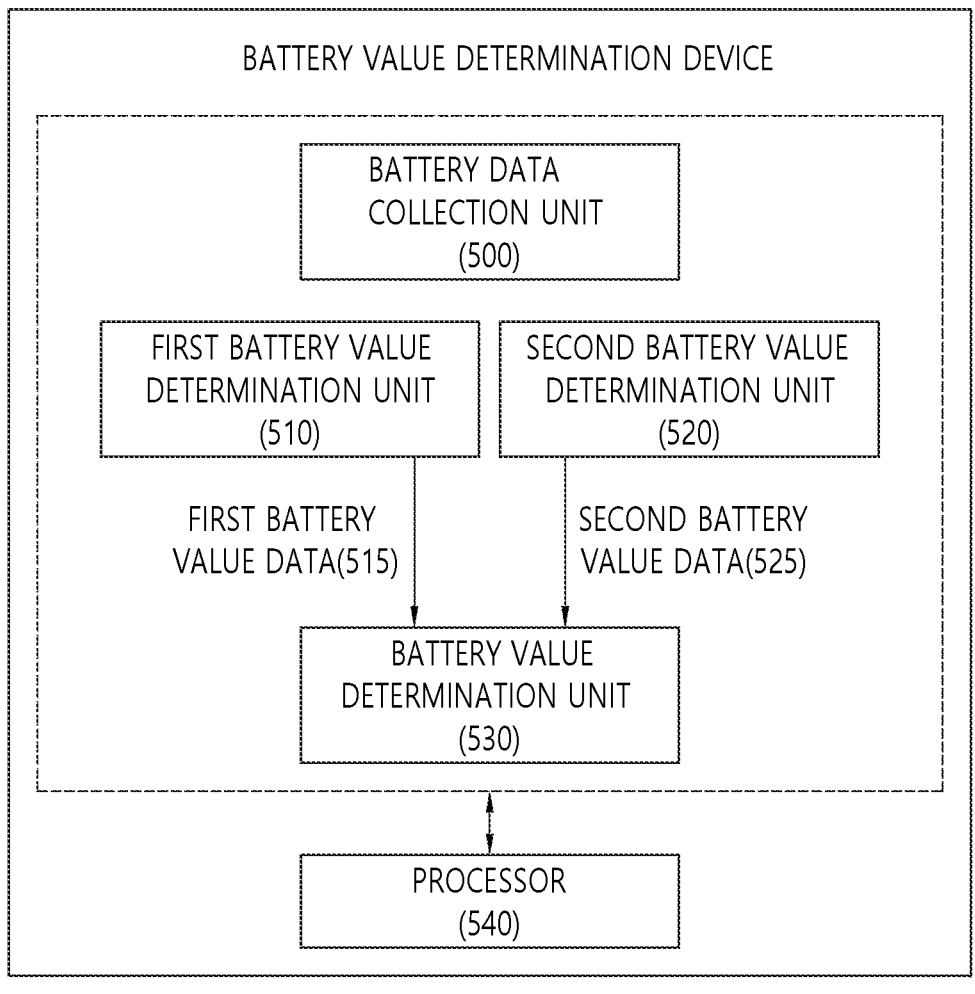
FIG. 5 is a conceptual diagram illustrating a battery value determination device according to an embodiment of the present invention.

FIG. 5 is a conceptual diagram illustrating a battery value determination device according to an embodiment of the present invention.

In FIG. 5, a battery value determination device for determining a residual value of a battery is disclosed.

Referring to FIG. 5, the battery value determination device may include a battery data collection unit 500, a first battery value determination unit 510, a second battery value determination unit 520, a battery value determination unit 530, and a processor 540.

The battery data collection unit 500 may collect information on a battery, which is a subject of value determination. The battery information may include information that is a basis for determining the value of the battery, such as battery identification information, battery usage information, vehicle driving data, or the like.

The first battery value determination unit 510 may directly determine the value of the battery through a battery diagnostic test. For example, the first battery value determination unit 510 may perform determination of a state of health (SoH) of the battery, and the SoH may include information on a charge amount maintained as compared to an initial charge amount. The first battery value determination unit 510 may generate first battery value data 515 as a result of the value determination.

The second battery value determination unit 520 may determine the value of the battery on the basis of vehicle data. For example, the vehicle data is data about a vehicle driven using the corresponding battery, and may include vehicle identification data, charging history data (fast/slow charging of the battery, charge amount (full charge and over charge)), battery usage environment data, vehicle driving data (driving speed, driving mileage, etc.), or the like. The second battery value determination unit 520 may generate second battery value data 525 as a result of the value determination.

The battery value determination unit 530 may be implemented to finally determine the value of the battery on the basis of the first battery value data 515 and the second battery value data 525. The battery value determination unit 530 may synthesize the first battery value data 515 and the second battery value data 525 to finally determine the value of the battery. A specific method of determining, by the battery value determination unit, the value of the battery will be described below.

The processor 540 may be implemented to control the operations of the battery data collection unit 500, the first battery value determination unit 510, the second battery value determination unit 520, and the battery value determination unit 530.

Figure 6:
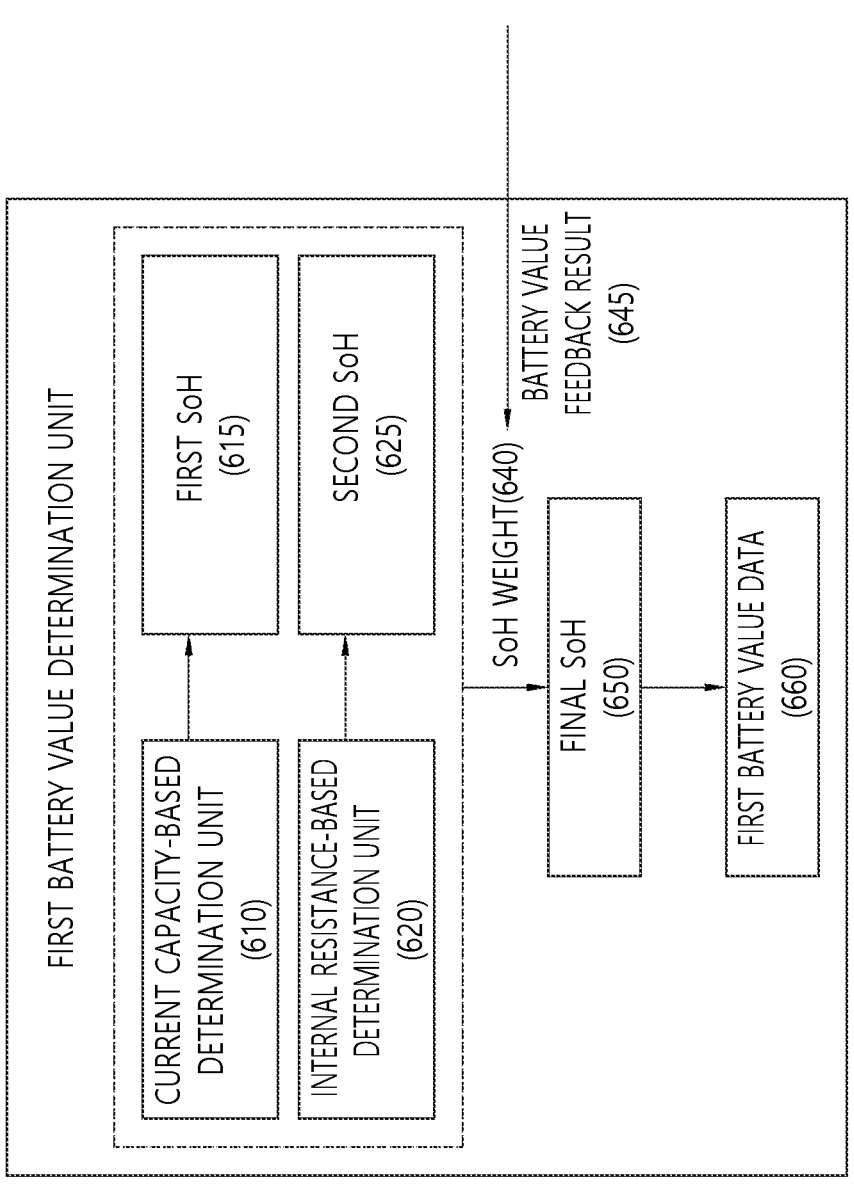
FIG. 6 is a conceptual diagram illustrating the operation of a first battery value determination unit according to an embodiment of the present invention.

FIG. 6 is a conceptual diagram illustrating the operation of a first battery value determination unit according to an embodiment of the present invention.

In FIG. 6, the operation of the first battery value determination unit is disclosed.

Referring to FIG. 6, the first battery value determination unit may determine a SoH of a battery through a battery diagnostic test to directly determine the value of the battery.

The first battery value determination unit may include a current capacity-based determination unit 610 and/or an internal resistance-based determination unit 620.

The current capacity-based determination unit 610 may determine the SoH of the battery using the current capacity and the internal parameters that change with a constant tendency during the aging of the battery. Since the capacity of the battery is reduced as the battery ages, the current capacity-based determination unit 610 may measure the capacity of the battery using a current integration method during charging and discharging to determine the SoH.

The internal resistance-based determination unit 620 may predict an internal resistance of the battery using the characteristics of a terminal current generated in the battery when the electric vehicle is driven to determine the SoH.

The internal resistance-based determination unit 620 may determine the SoH in consideration that an internal resistance $R_s$ of the battery proportionally increases based on a battery equivalent circuit model including a resistor-capacitor (RC) ladder as the charge/discharge number increases. The internal resistance $R_s$ is estimated using a relationship between a terminal current and a terminal voltage when a discharge current is rapidly generated. In this case, a change ($\Delta V$) of the terminal voltage is determined by the internal resistance $R_s$ contributing to an instantaneous voltage change, and a ladder voltage with a long time constant is negligible. In order to solve a current integration error and an error caused by the capacity changed during aging, a fully charged state in which the terminal voltage reaches a maximum allowable voltage of the battery may be determined as an $R_s$ estimation time.

A final SoH 650 may be determined based on a first SoH 615 determined by the current capacity-based determination unit 610 and a second SoH 625 determined by the internal resistance-based determination unit 620. The first battery value determination unit may determine first battery value data 660 based on the determined SoH.

The final SoH 650 may be determined by assigning different weights to each of the first SoH 615 and the second SoH 625.

Different SoH weights $w_x$ and $w_y$ 640 may be assigned to each of the first SoH 615 and the second SoH 625 according to a battery identifier and battery information (year of battery, battery usage environment (e.g., battery cooling environment)). In consideration of a first value determination result obtained by the first battery value determination unit and a battery value feedback result 645 for an actual battery value, the weights of the first and second SoHs 615 and 625 may be adaptively adjusted, and the final SoH 650 may be determined based on the adaptively adjusted first and second SoHs 615 and 625.

Figure 7:
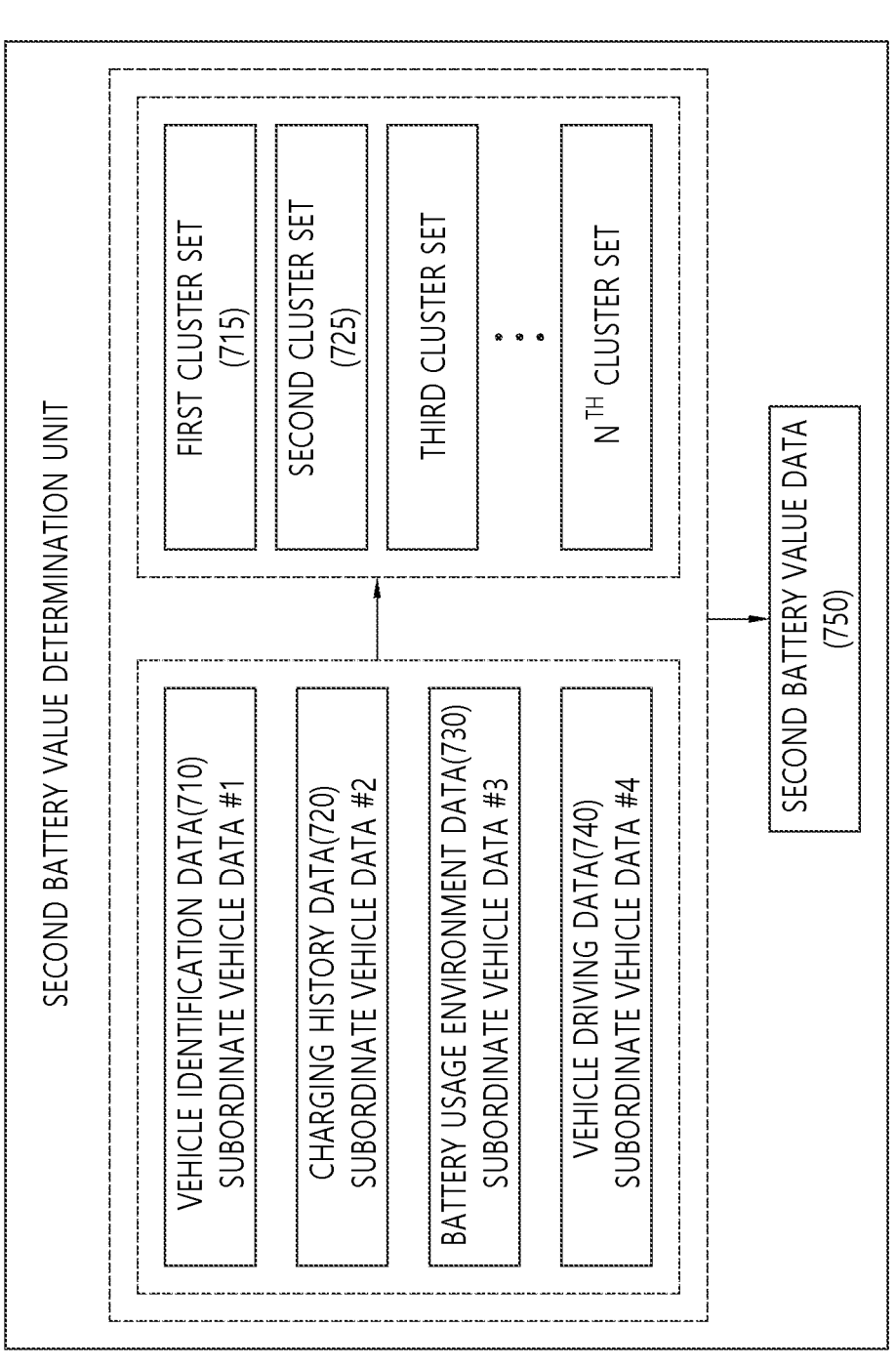
FIG. 7 is a conceptual diagram illustrating the operation of a second battery value determination unit according to an embodiment of the present invention.

FIG. 7 is a conceptual diagram illustrating the operation of a second battery value determination unit according to an embodiment of the present invention.

In FIG. 7, a method of generating, by the second battery value determination unit, second battery value data based on vehicle data is disclosed.

Referring to FIG. 7, the second battery value determination unit may perform determination of the value of a battery on the basis of vehicle identification data 710, charging history data 720, battery usage environment data 730, vehicle driving data 740, or the like to generate second battery value data 750.

The vehicle identification data 710 is data for identifying a vehicle in which the battery is installed. The vehicle identification data 710 may include information on a type of a vehicle, a vehicle model name, a vehicle production year, or the like.

The charging history data 720 is a charging history for the battery, and may include data on whether fast or slow charging is performed, the number of times of charging, the charging amount during charging, or the like.

The battery usage environment data 730 is data about a usage environment in which the battery is used, and may include information on an environment (air-cooled type, water-cooled type, etc.) in which the battery is cooled, information on a temperature at which the battery is used, or the like.

The vehicle driving data 740 is data regarding the driving of the vehicle, and may include information on a vehicle driving mileage, a vehicle driving speed, the number of times of rapid start/rapid acceleration, or the like.

The vehicle identification data 710, the charging history data 720, the battery usage environment data 730, and the vehicle driving data 740 are examples used for generating, by the second battery value determination unit, the second battery value data 750, and other various pieces of data may be used.

The vehicle identification data 710, the charging history data 720, the battery usage environment data 730, and the vehicle driving data 740 may be expressed as four subordinate vehicle data coordinate values (a, b, c, and d), respectively. The vehicle identification data 710 may be expressed as subordinate vehicle data #1, the charging history data 720 may be expressed as subordinate vehicle data #2, the battery usage environment data 730 may be expressed as subordinate vehicle data #3, and the vehicle driving data 740 may be expressed as subordinate vehicle data #4.

Each of the vehicle identification data 710, the charging history data 720, the battery usage environment data 730, and the vehicle driving data 740 may be expressed as a single numerical value in consideration of the similarity of data.

The vehicle identification data 710 may be quantified in consideration of the similarity of the vehicle. For example, the similarity of the vehicle may be determined in consideration of the determination of each of the similarity of a model of a vehicle and the similarity of a vehicle production year.

The charging history data 720 may be quantified in consideration of the similarity of the charging history. The similarities of data indicating whether fast or slow charging is performed, data indicating the number of times of charging, and data indicating the charging amount during charging, which are the subordinate data included in the charging history data 720, may each be quantified and then synthesized to determine the similarity of the charging history.

The battery usage environment data 730 may be quantified in consideration of the similarity of the usage environment of the battery. The similarity of the cooling environment of the battery and the similarity of the temperature at which the battery is used may each be quantified and then synthesized to determine the similarity of the usage environment of the battery.

The vehicle driving data 740 may be quantified in consideration of the similarity of the vehicle driving. The similarity of the driving mileage of the vehicle, the similarity of the driving speed of the vehicle and the similarity of the number of times of rapid start/rapid acceleration may each be quantified and then synthesized to determine the similarity of the vehicle driving.

Vehicle identification data, charging history data, battery usage environment data, and vehicle driving data of each of a plurality of vehicles may be expressed as four subordinate vehicle data coordinate values (a, b, c, and d) serving as subordinate vehicle data on a four-dimensional second battery value determination plane.

The plurality of vehicle data coordinate values may be clustered to form a first cluster set (including a first cluster #1 to a first cluster #n) 715.

In the present invention, the four subordinate vehicle data coordinate values may be grouped to form different clusters. For example, the vehicle identification data 710 and the charging history data 720 may form one subordinate vehicle data group #1, and the charging history data 730 and the battery usage environment data 740 may form one subordinate vehicle data group #2.

The subordinate vehicle data group #1 and the subordinate vehicle data group #2 may be expressed as vehicle data coordinate values (a, b) on a two-dimensional second battery value determination plane in consideration of the similarity in the same manner. The vehicle data coordinate values corresponding to the subordinate vehicle data group #1 and the subordinate vehicle data group #2 may be clustered to form a second cluster set (including a second cluster #1 to a second cluster #n) 725.

In this way, the first cluster set 715 to an $n^{th}$ cluster set may be formed based on a combination of various pieces of the subordinate vehicle data, and the first cluster set 715 to the $n^{th}$ cluster set may be used to generate the second battery value data 750 by determining only some clusters among the first cluster set to the $n^{th}$ cluster set as valid cluster sets in consideration of a value determination result and a feedback result for an actual battery value.

Figure 8:
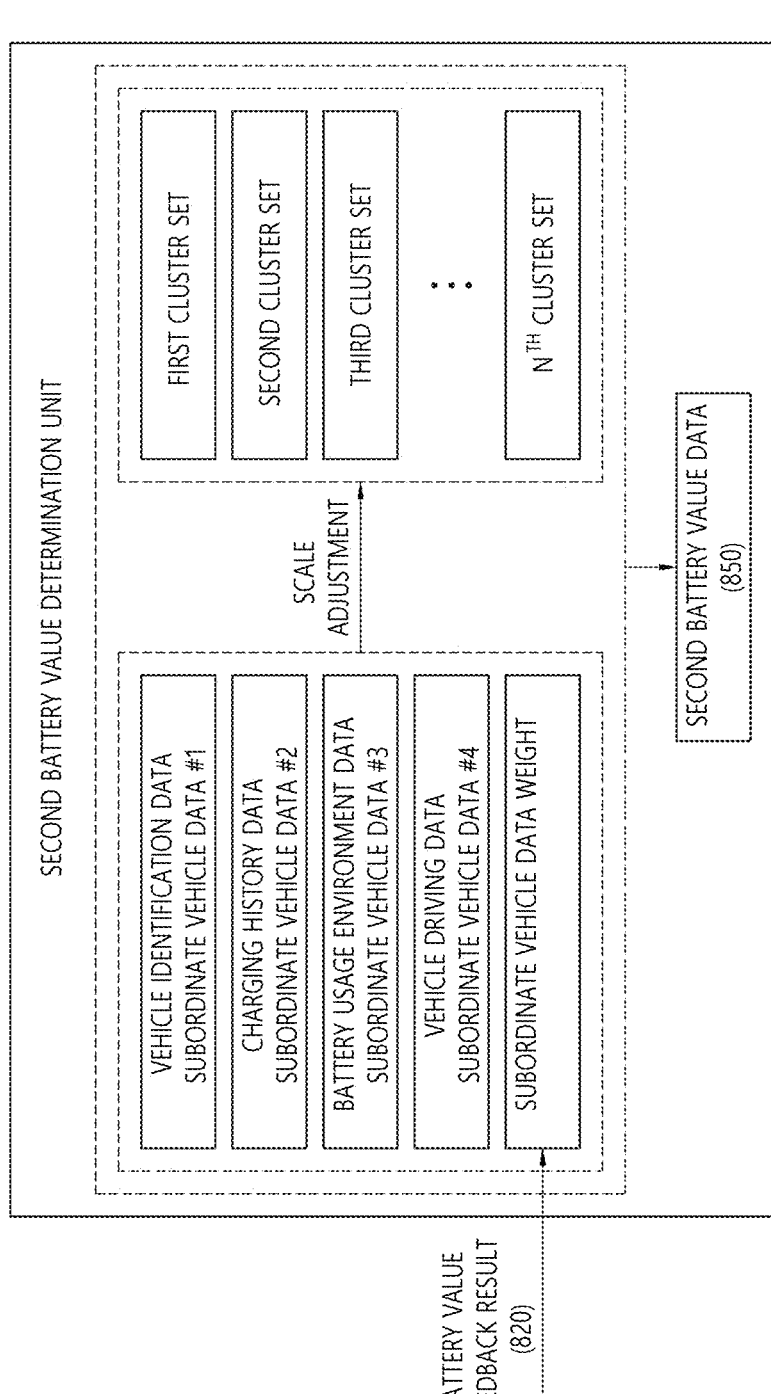
FIG. 8 is a conceptual diagram illustrating the operation of a second battery value determination unit according to an embodiment of the present invention.

FIG. 8 is a conceptual diagram illustrating the operation of a second battery value determination unit according to an embodiment of the present invention.

In FIG. 8, a method of generating, by the second battery value determination unit, second battery value data by adaptively adjusting vehicle data based on feedback data is disclosed.

Referring to FIG. 8, a weight for each of vehicle identification data, charging history data, battery usage environment data, and vehicle driving data, which are subordinate vehicle data, may be adjusted.

For more accurate prediction, weights $w_1$, $w_2$, $w_3$, and $w_4$ respectively serving as weights for the vehicle identification data, the charging history data, the battery usage environment data, and the vehicle driving data may be adjusted based on a second value determination result obtained by the second battery value determination unit and a feedback result for an actual battery value. The weights $w_1$, $w_2$, $w_3$, and $w_4$ may be called "subordinate vehicle data weights."

First, cluster-based prediction may be performed based on the same weight, and the set values of the weights $w_1$, $w_2$, $w_3$, and $w_4$ in which an error between the value determination result and the actual battery value is minimized may be determined based on the feedback result.

A scale of a coordinate axis on the second battery value determination plane may be changed according to the values of the weights $w_1$, $w_2$, $w_3$, and $w_4$. The scale of the coordinate axis on the second battery value determination plane may be adjusted so that the higher the weight, the closer to each other.

Such scale adjustment may be performed in units of the above-described cluster sets (the first cluster set to the $n^{th}$ cluster set).

The value determination result and a battery value feedback result 820 for the actual battery value may be obtained through continuous checking of the use of the battery, and as data on the use of the battery is accumulated, the weights $w_1$, $w_2$, $w_3$, and $w_4$ may be optimally set to generate more accurate second battery value data 850.

Figure 9:
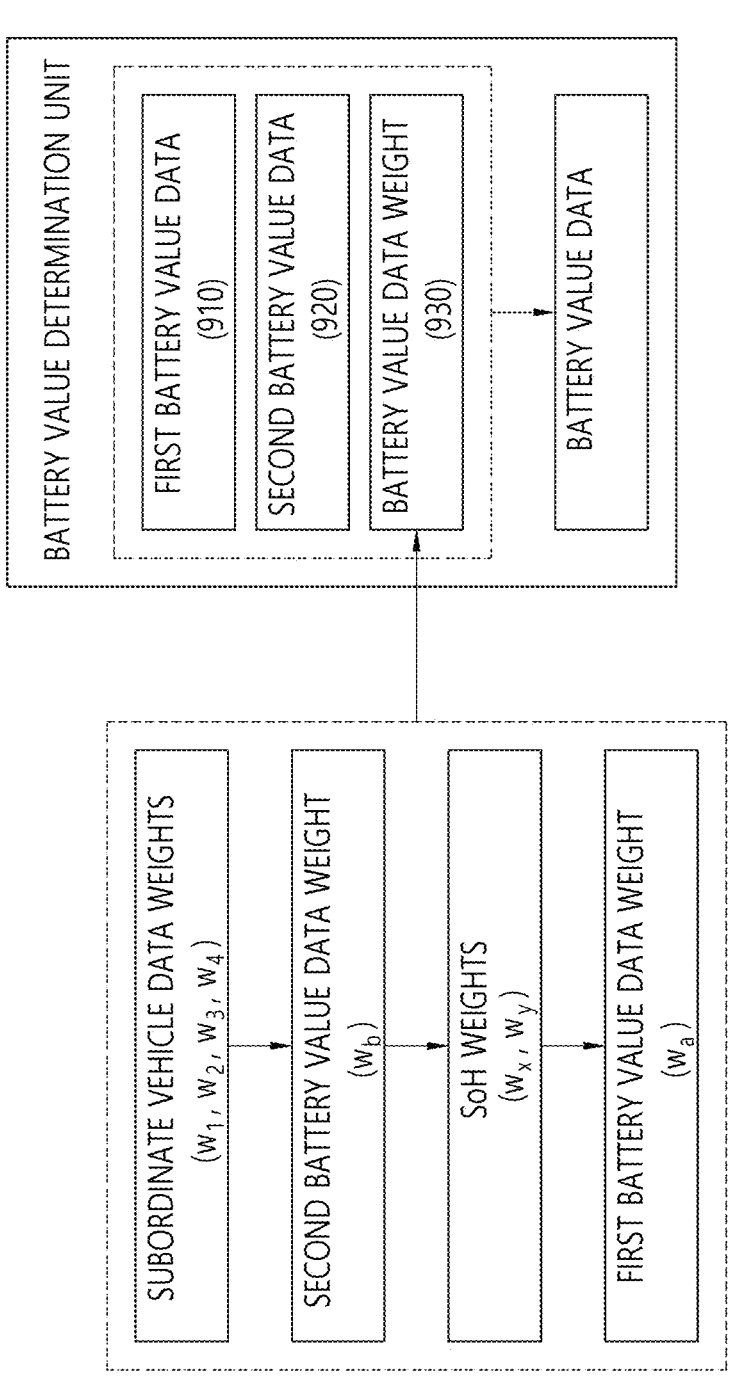
FIG. 9 is a conceptual diagram illustrating the operation of a battery value determination unit according to an embodiment of the present invention.

FIG. 9 is a conceptual diagram illustrating the operation of a battery value determination unit according to an embodiment of the present invention.

In FIG. 9, a method of finally determining, by the battery value determination unit, the value of the battery on the basis of the determination result of each of the first battery value determination unit and the second battery value determination unit is disclosed.

Referring to FIG. 9, the first battery value determination unit may determine first battery value data 910, and the second battery value determination unit may determine second battery value data 920.

The battery value determination unit may determine battery value data on the basis of the first battery value data 910 and the second battery value data 920.

The battery value data may be determined based on the first battery value data 910 and the second battery value data 920, and may be determined by applying the weights $w_a$ and $w_b$ to the first battery value data 910 and the second battery value data 920, respectively.

The weights $w_a$ and $w_b$ may be called "battery value data weights 930."

The battery value data weights 930 may be determined in consideration of the value determination result and the feedback result for the actual battery value.

The battery value determination unit according to the embodiment of the present invention may adjust the weights in the following order.

1) Adjustment of weights $w_1$, $w_2$, $w_3$, and $w_4$ of the subordinate vehicle data.

2) Adjustment of a weight $w_b$ of the second battery value data.

3) Adjustment of weights $w_x$ and $w_y$ of a SoH.

4) Adjustment of a weight $w_a$ of the first battery value data.

1) and 2) may be weight adjustments based on data, and 3) and 4) may be weight adjustments based on physical and/or chemical principles. The weight adjustments based on data may have a relatively large change range, and the weight adjustments based on physical and/or chemical principles may have a relatively small change range.

Therefore, by first performing the weight adjustments based on the data and then performing the weight adjustments based on the physical and/or chemical principles, more accurate battery value data may be determined.

The embodiments of the present invention described above may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present invention or may be available instructions well known to those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and execute the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims, and encompass all modifications and equivalents that fall within the scope of the appended claims.

What is claimed is:

1. A method comprising:

via a processor of a computing device:

collecting battery state data of a battery in an electric vehicle, collecting electric vehicle data of the electric vehicle, the electric vehicle data including data regarding route information of the electric vehicle, performing a battery diagnostic test on the battery via:

executing a current capacity-based determination unit to measure a current capacity of the battery using current integration during charging and discharging of the battery to determine a first state of health (SoH) of the battery based on the current capacity, and executing an internal resistance-based determination unit to determine an internal resistance of the battery based on a terminal current generated in the battery during driving of the electric vehicle to determine a second SoH of the battery based on the internal resistance, determining a residual battery value of the battery based on the first battery value and a second battery value, the first battery value determined based on the first SoH and the second SoH and the second battery value determined based on the electric vehicle data comprising vehicle identification data, charging history data, battery usage environment data, and vehicle driving data, determining at least one replacement timing of the battery based on the battery state data, determining at least one replacement place of the target battery, providing a plurality of sets of battery replacement recommendations to a user, at least one set of the plurality of sets recommending the at least one replacement timing and the at least one replacement place of the target battery to the user, at least one of the sets of the plurality of sets being based on routine travel times on a route the user routinely travels in the electric vehicle, and receiving a selection of the battery replacement recommendation from the user among the plurality of sets of recommendations;

replacing the battery with a fully charged battery at the at least one replacement place using a replacement service for a second-type battery using a change in an initial battery value based on the residual battery value.

2. The method of claim 1, wherein the first SoH represents information on a charge amount maintained as compared to an initial charge amount of the battery.

3. The method of claim 1, wherein the second SoH is determined based on a battery equivalent circuit model.

4. The method of claim 3, wherein the internal resistance is estimated using a relationship between a terminal current and a terminal voltage during generation of a discharge current during driving of the electric vehicle.

5. The method of claim 4, wherein:

the first battery value is based on a final SoH determined using the first SoH and the second SoH, the final SoH is determined by assigning different weights to the first SoH and the second SoH.

6. The method of claim 1, wherein the electric vehicle data including data regarding a destination to which the electric vehicle intends to move, a speed of the electric vehicle, and a driving environment of the electric vehicle.

7. The method of claim 6, wherein the step of replacing the battery includes providing a first-type battery replacement service and a second-type battery replacement service, the first-type battery replacement service being a replacement service for a first-type battery in which a user's initial battery value is not considered and the second-type battery replacement service is a replacement service for the second-type battery.

*    *    *    *    *